UNITED STATES PATENT OFFICE.

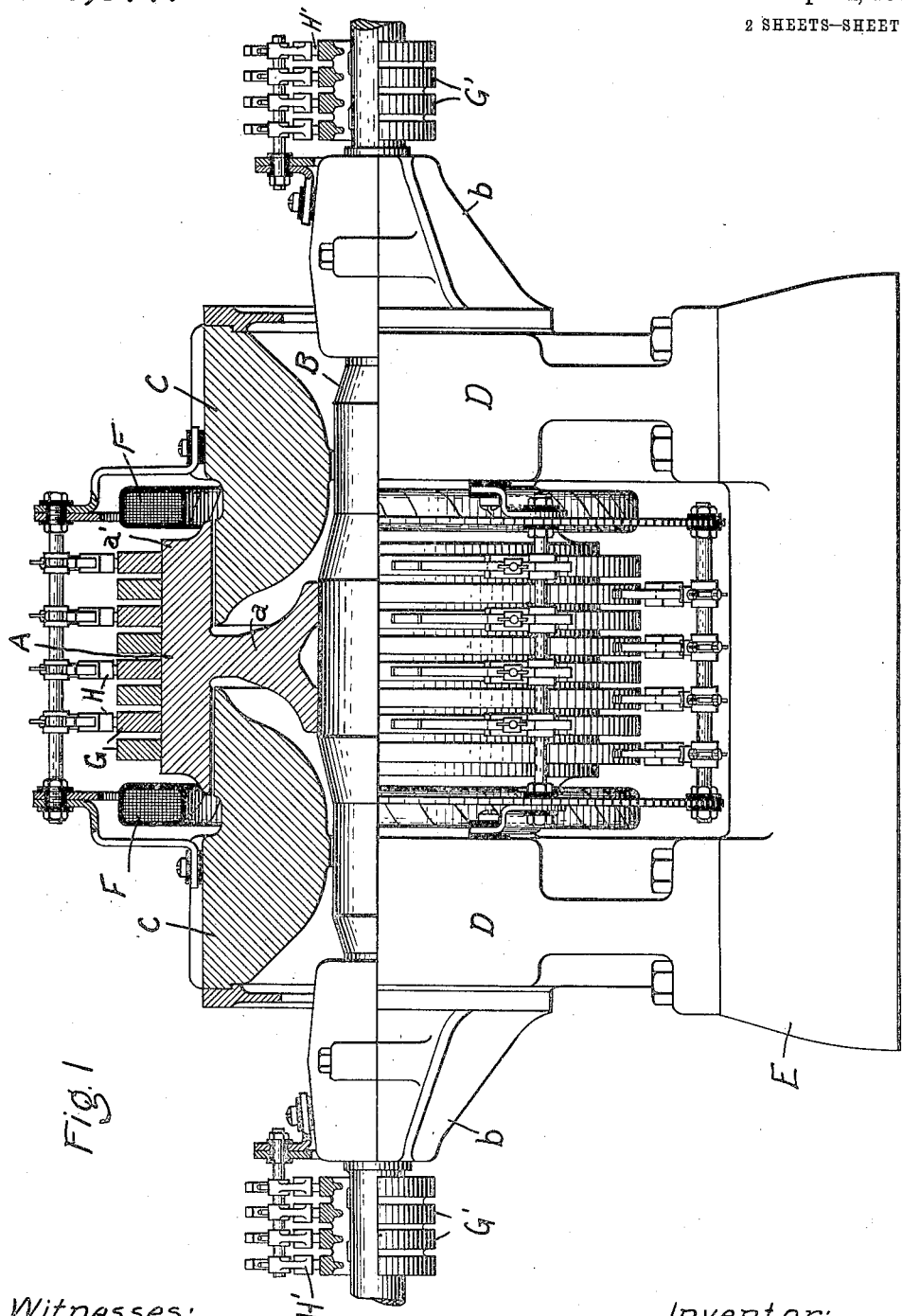

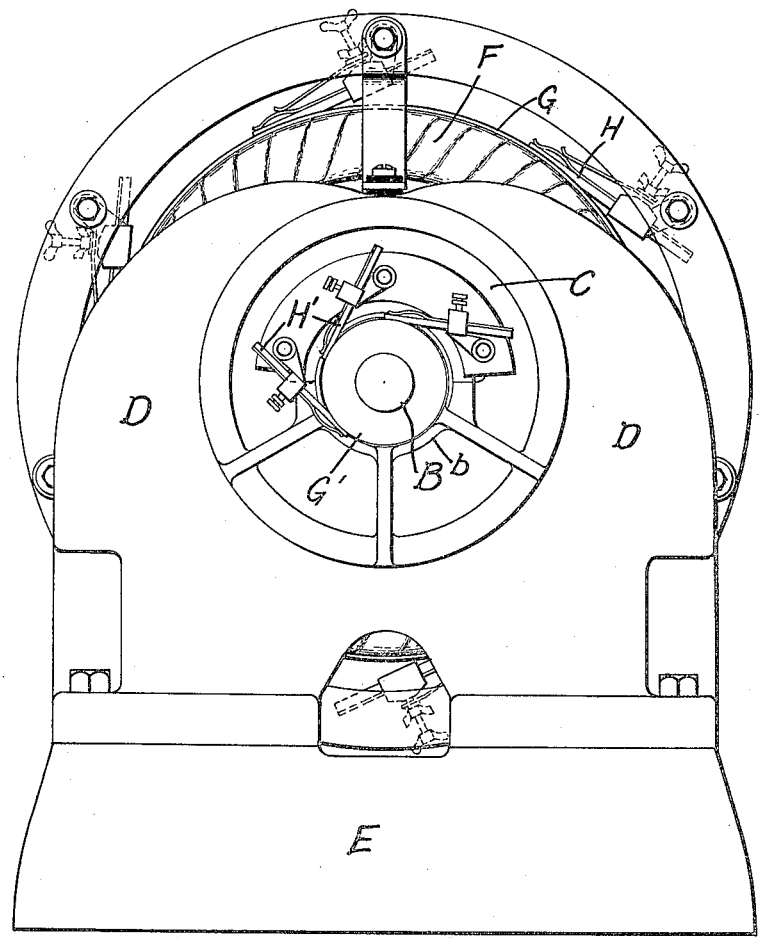

JAKOB E. NOEGGERATH, OF SCHENECTADY, NEW YORK, ASSIGNOR TO GENERAL ELECTRIC COMPANY, A CORPORATION OF NEW YORK.

DYNAMO-ELECTRIC MACHINE.

988,377.     Specification of Letters Patent.     Patented Apr. 4, 1911.

Application filed September 23, 1909. Serial No. 519,275.

*To all whom it may concern:*

Be it known that I, JAKOB E. NOEGGERATH, a citizen of the United States, residing at Schenectady, county of Schenectady, State of New York, have invented certain new and useful Improvements in Dynamo-Electric Machines, of which the following is a specification.

My invention relates to dynamo electric machines of the unipolar type, and its object is to provide a machine of novel design having the advantages of a very open construction, permitting efficient cooling and affording free access to all parts, and of a small magnetic pull in the direction of the axis.

My invention, which is particularly applicable to machines of low voltage and high current capacity, will best be understood by reference to the accompanying drawings in which—

Figure 1 shows a side elevation, partly in cross-section of a machine constructed in accordance with my invention, and Fig. 2 shows end elevation.

In the drawings A represents the armature carried by the shaft B. The armature comprises a central disk or spider $a$ and an overhanging peripheral portion forming flanges $a'$ extending axially on each side of the central disk or spider. C C represent cylindrical field frame members extending beneath and adjacent to the overhanging flanges of the armature whereby a small cylindrical air gap is formed between said frame members and said flanges. These cylindrical members are supported by members D D which also carry the bearings $b$ $b$ for the shaft. These members D D, with the bed plate E on which they rest, form a magnetic connection between the two cylindrical members C C. F F represent circumferentially extending field coils surrounding the members C C. These coils produce a magnetization of the machine along its axis, the flux passing from one member C radially outward into one overhanging flange of the armature, across the peripheral portion of the armature, radially inward from the other overhanging flange into the other member C, and then back through the members D and the bed plate E to the other member C. A voltage is therefore induced in the armature in rotation between its periphery and the shaft. Collector rings G are placed on the periphery of the armature and are engaged by brushes H, while other sets of collector rings G' are placed on one or both ends of the armature shaft outside of the members C. Brushes H' engage the collector rings G'. The brushes H form one terminal of the machine and the brushes H' the other.

Since the magnetic circuit of the field structure lies on one side only of the armature, the armature, field coils, collector rings, and brushes, are all left open and exposed so that efficient ventilation is obtained and all parts are readily accessible. Furthermore because of the design of the magnetic circuit, no unbalanced magnetic pull of any magnitude in an axial direction can exist.

I do not desire to limit myself to the particular construction and arrangement of parts shown and described, but aim in the appended claims to cover all modifications which are within the scope of my invention.

What I claim as new and desire to secure by Letters Patent of the United States is:

1. In a unipolar dynamo-electric machine, an armature comprising a central disk or spider and an overhanging peripheral portion with axially extending flanges on opposite sides of said disk or spider, cylindrical field frame members surrounding the armature shaft and extending beneath and adjacent to said flanges whereby a small cylindrical air gap is formed between said frame members and said flanges, circumferentially extending field coils surrounding said members, and a field support or bed plate magnetically connecting said members on one side only of said armature so that said armature and field coils are open and exposed.

2. In a unipolar dynamo-electric machine, an armature comprising a central disk or spider and an overhanging peripheral portion with axially extending flanges on opposite sides of said disk or spider, cylindrical field frame members surrounding the armature shaft and extending beneath and adjacent to said flanges whereby a small cylindrical air gap is formed between said frame members and said flanges, circumferentially extending field coils surrounding said members, a field support or bed plate magnetically connecting said members on one side only of said armature so that said armature and field coils are open and exposed, and collector rings carried on the periphery of said armature.

3. In a unipolar dynamo-electric machine, an armature comprising a central disk or spider and an overhanging peripheral portion with axially extending flanges on opposite sides of said disk or spider, cylindrical field frame members surrounding the armature shaft and extending beneath and adjacent to said flanges, circumferentially extending field coils surrounding said members, a field support or bed plate magnetically connecting said members on one side only of said armature so that said armature and field coils are open and exposed, collector rings carried on the periphery of said armature, and other collector rings carried on both ends of the armature shaft outside of said members.

In witness whereof, I have hereunto set my hand this 17th day of September, 1909.

JAKOB E. NOEGGERATH.

Witnesses:
BENJAMIN B. HULL,
EMMA B. COONS.